July 25, 1933.  G. B. WATKINS  1,919,757
PROCESS OF TREATING LAMINATED GLASS TO PREPARE IT FOR SEALING
Filed Oct. 14, 1929
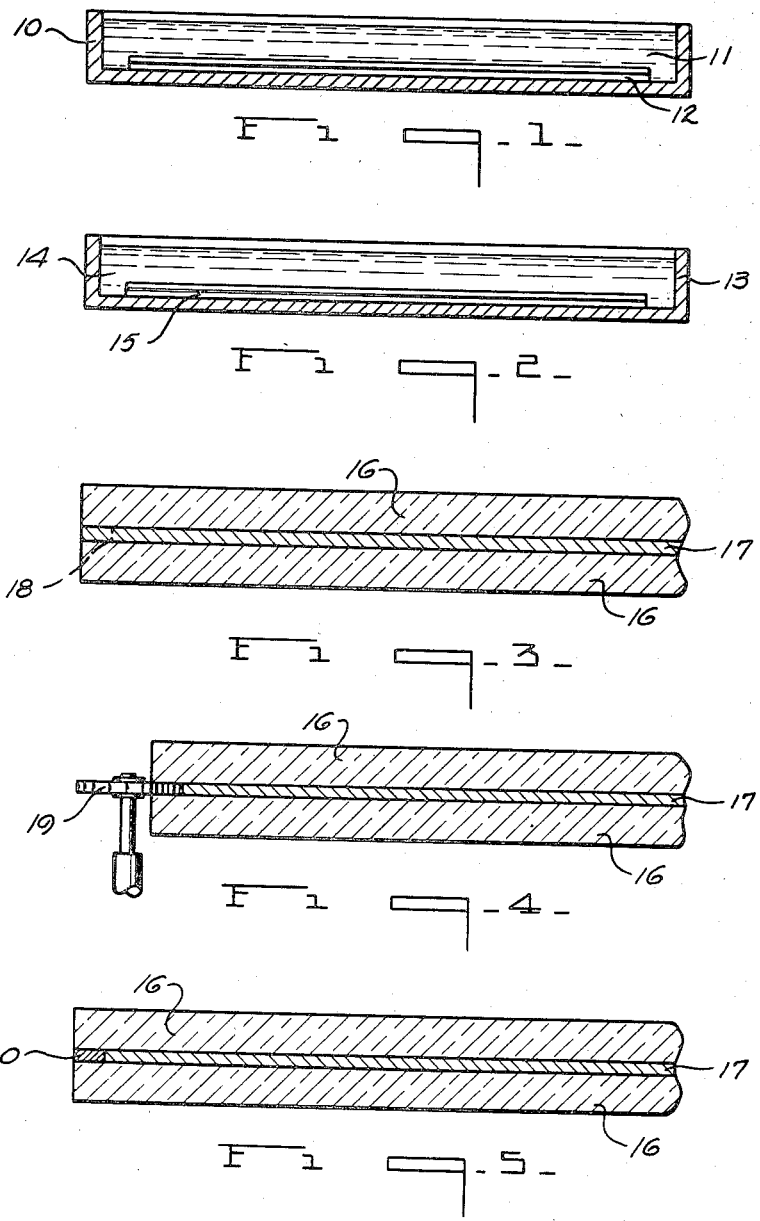
Inventor
George B. Watkins
By Frank Fraser,
Attorney Patented July 25, 1933

1,919,757

UNITED STATES PATENT OFFICE

GEORGE R. WATKINS, OF TOLEDO, OHIO, ASSIGNOR TO LIBBEY-OWENS-FORD GLASS COMPANY, OF TOLEDO, OHIO, A CORPORATION OF OHIO

PROCESS OF TREATING LAMINATED GLASS TO PREPARE IT FOR SEALING

Application filed October 14, 1929. Serial No. 399,526.

The present invention relates to a process of treating laminated glass to prepare it for the sealing thereof.

The expression "laminated glass" is used to designate a composite structure consisting of two or more sheets of glass with an interposed sheet or sheets of non-brittle material such as pyroxylin plastic. The laminations are ordinarily bonded together by the aid of some suitable solvent, cement, or other bond inducing medium.

The life of the laminated sheet is dependent to a considerable degree upon the permanency of the bond between the various laminations. To assist in protecting the bond especially around the marginal portions of laminated sheets, it is often considered advisable to seal or lute such sheets. If a laminated sheet is properly sealed to protect the bond between the laminations from the atmosphere, etc. there will be no undue tendency toward the development of let-goes around the marginal portions thereof.

Broadly speaking, a laminated sheet of glass is sealed by grooving or channeling the sheet as by removing marginal portions of the non-brittle membrane from between the glass, and then inserting a weather-proof material therein. To produce an efficient seal, the surfaces of the glass should be clean. Due to the variations in thickness of the non-brittle membrane and variations in thickness of the glass, it has been a difficult matter in the past to channel the sheet without considerable breakage.

In accordance with the present invention, the laminated sheet is treated in a manner that the removal of the material from between the glass laminations is made comparatively simple. Stated broadly, this is accomplished by treating the edges of the laminated sheet with a solvent, after which a liquid, mutually soluble with the solvent first used, is applied, thereby removing the solvent from the non-brittle membrane which throws said membrane out of the colloidalized state, reducing it to a non-plastic condition. In this condition, the broken down plastic non-brittle membrane can be removed readily leaving no film to the edge of the glass.

Other objects and advantages of the invention will become more apparent during the course of the following description when taken in connection with the accompanying drawing.

In the drawing wherein like numerals are employed to designate like parts throughout the same, Fig. 1 is a vertical sectional view illustrating diagrammatically a sheet of laminated glass being treated in accordance with this invention, Fig. 2 is a similar view representing a further treatment of the sheet, Fig. 3 is a fragmentary vertical section through a sheet of laminated glass after it has been treated, Fig. 4 is a vertical view, partly in section, illustrating the removal of the non-brittle material from the laminated sheet to provide the channel for the sealing material, and Fig. 5 is a fragmentary sectional view of a finished sheet of laminated glass.

This invention is in no way limited to any particular method of manufacture of the laminated glass or to the materials used therein. However, as it is generally customary to use pyroxylin plastic as the non-brittle membrane, this process will be described in connection with the treating of laminated glass made with such material. It will be distinctly understood that if a substance other than pyroxylin plastic is employed as the non-brittle membrane, the same invention can be followed out by proper changing of the ingredients used.

In accordance with this invention, after the laminations have been bonded together, it is preferred that they be ground to size or pattern. The sheet is then preferably immersed in a solvent. In Fig. 1, the numeral 10 designates a receptacle containing a bath of solvent 11 in which the laminated sheet 12 is immersed. Obviously, it is not necessary to immerse the entire sheet into the bath of solvent if only one or two edges are to be sealed. As an example of a solvent which may be used to carry out the process, acetone is mentioned. The length of time the sheet is left in the solvent is dependent upon, among other things, the depth of penetration desired and temperature. It has been found that the solvent will penetrate the pyroxylin plastic sheet to a uniform depth on all exposed edges, thereby dissolving or softening the plastic to the extent of penetration.

In Fig. 2, the receptacle 13 contains a liquid 14 which is mutually soluble with the solvent 11. The numeral 15 is used to designate the sheet of laminated glass after it has been treated in the receptacle 10. Where acetone is used as the solvent in the receptacle 10, water may be used in the receptacle 13. Taking advantage of the mutual solubility of water and acetone, it has been found that by immersing the glass in water after it has had the preliminary acetone treatment, the acetone is removed from the softened film due to its solubility in water. As the acetone leaves the film or non-brittle membrane and is dissolved in the water, the cellulose nitrate is precipitated or thrown out of the colloidalized state, thereby reducing it to a non-plastic state.

Obviously, there are solvents other than acetone which may be used to penetrate or soften the surface of the pyroxylin plastic sheet and liquids other than water for the precipitation of the nitro-cellulose. By way of example, it is mentioned that ethyl acetate may be used instead of acetone, while aromatic hydrocarbons (toluene) or the aliphatic hydrocarbons (ordinary gasoline) may be used instead of the water, the only requirements in the choice of these solvents being that the liquids used to colloidalize or soften the pyroxylin plastic sheet be mutually soluble in the liquids used to precipitate or throw out the nitro-cellulose from the colloidalized film. I consider the acetone preferable because of its speed of penetration into the pyroxylin plastic sheet and its mutual solubility with water.

Referring to Fig. 3, the sheets of glass 16 and sheet of non-brittle pyroxylin plastic material 17 compose the composite sheet to be sealed. The dotted line 18 is used to indicate the depth of the solvent penetration when the sheet is in the solvent 11 in receptacle 10. This depth is not materially changed while the sheet is in the liquid 14, although the characteristic of the pyroxylin plastic from the line 18 to the edge of said pyroxylin plastic is changed.

The pyroxylin plastic lying between the line 18 and edge of the sheet may be removed in any desired manner, although it is preferred that a rotary saw or undercutting tool 19 be employed. While the present invention is not dependent upon any type of mechanical means employed in the removal of the pyroxylin plastic to form the seal receiving channel, nevertheless it is of advantage to use a saw capable of forming the groove without chipping the glass. The removal of the pyroxylin plastic by this tool is comparatively easy after it has been treated in the manner above described. The broken down plastic can be cut away very readily and without leaving a film on the edge of the glass. Due to the fact that the pyroxylin plastic has been treated in a manner to change the physical characteristics thereof and to break down the bond between it and the glass, the hazard of chipping of the glass has been reduced to a minimum.

Although the bond between the glass sheets and pyroxylin plastic is broken down to the depth of the seal to be used, it is to be distinctly understood that the remainder of the sheet is in no way adversely affected by the treatment of the liquids. Obviously, the depth of saw cut made by the instrument 19 is approximately identical with the depth of penetration of the solvent 11. After the pyroxylin plastic has been channeled out, a sealing material may be placed therein to create the seal 20 shown in Fig. 5.

The method of subjecting the laminated sheet to the action of the solvent or solvents used and the liquid or liquids mutually soluble therewith is, of course, not limited to the use of a liquid bath as a vapor bath can and has been used successfully. Obviously, the solvents used to penetrate the non-brittle membrane will give the same results in the vapor phase as in the liquid phase.

I claim:

1. The process of treating laminated glass, comprising two sheets of glass and a sheet of non-brittle material, to prepare it for sealing, consisting in treating the marginal portions of the non-brittle sheet with a solvent, then treating said portions of the non-brittle sheet with a liquid mutually soluble with the solvent used, and then removing those portions of the non-brittle material so treated.

2. The process of treating laminated glass, comprising two sheets of glass and an interposed sheet of pyroxylin plastic, to prepare it for sealing, consisting in subjecting the marginal portions of the pyroxylin plastic to the action of a solvent for a sufficient length of time that the solvent will penetrate the pyroxylin plastic to the desired depth, then treating the same portions of the pyroxylin plastic sheet with a liquid which is mutually soluble with the solvent first used to render those portions of the pyroxylin plastic sheet non-plastic, and then removing the non-plastic portions of the pyroxylin sheet.

3. The process of treating laminated glass, comprising two sheets of glass and an interposed sheet of pyroxylin plastic, to prepare it for sealing, consisting in subjecting the marginal portions of the pyroxylin plastic to the action of acetone for a sufficient length of time that the acetone will penetrate the pyroxylin plastic to the desired depth, then treating the same portions of the pyroxylin plastic sheet with a liquid which is mutually soluble with the acetone first used to render those portions of the pyroxylin plastic sheet non-plastic, and then removing the non-plastic portions of the pyroxylin sheet.

4. The process of treating laminated glass, comprising two sheets of glass and an interposed sheet of pyroxylin plastic, to prepare it for sealing, consisting in subjecting the marginal portions of the pyroxylin plastic to the action of a solvent for a sufficient length of time that the solvent will penertate the pyroxylin plastic to the desired depth and replace, so to speak, the plasticizer contained in said pyroxylin plastic, then treating the same portions of the pyroxylin plastic sheet with a liquid which is mutually soluble with the solvent first used to withdraw the major portion of the solvent first applied and to also precipitate the said treated pyroxylin plastic, and then removing those portions of the pyroxylin sheet so treated.

GEORGE B. WATKINS.